(12) United States Patent
Klein et al.

(10) Patent No.: US 10,442,161 B2
(45) Date of Patent: Oct. 15, 2019

(54) COMPOSITE PANE WITH ILLUMINATION

(71) Applicant: Saint-Gobain Glass France, Courbevoie (FR)

(72) Inventors: Marcel Klein, Baesweiler (DE); Dirk Doerner, Emmendingen (DE); Herbert Bayer, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/741,244

(22) PCT Filed: Aug. 15, 2016

(86) PCT No.: PCT/EP2016/069323
§ 371 (c)(1),
(2) Date: Dec. 30, 2017

(87) PCT Pub. No.: WO2017/029254
PCT Pub. Date: Feb. 23, 2017

(65) Prior Publication Data
US 2018/0194113 A1    Jul. 12, 2018

(30) Foreign Application Priority Data
Aug. 14, 2015   (EP) ..................................... 15181016

(51) Int. Cl.
*F21V 9/00*      (2018.01)
*B32B 17/10*    (2006.01)
(Continued)

(52) U.S. Cl.
CPC .......... *B32B 17/10036* (2013.01); *B32B 3/02* (2013.01); *B32B 5/02* (2013.01);
(Continued)

(58) Field of Classification Search
CPC ........ B32B 17/10036; B32B 17/10541; B32B 17/10761; F21V 33/00; G02B 6/00
See application file for complete search history.

(56) References Cited

U.S. PATENT DOCUMENTS

2007/0077099 A1    4/2007  Ota
2007/0098969 A1*   5/2007  Ansems ............ B32B 17/10036
                                                          428/212
(Continued)

FOREIGN PATENT DOCUMENTS

DE    202004011577 U1    9/2005
DE    102005036869 A1    2/2007
(Continued)

OTHER PUBLICATIONS

International Search Report for International Application No. PCT/EP2016/069323 filed Aug. 15, 2016 on behalf of Saint-Gobain Glass France, dated Nov. 15, 2016. 5 pages. (German + English Translation).

(Continued)

*Primary Examiner* — Ali Alavi
(74) *Attorney, Agent, or Firm* — Steinfl + Bruno, LLP

(57) ABSTRACT

Composite pane, in particular a laminated side pane for a side window of a vehicle. The composite pane includes an outer pane and an inner pane that are bonded to one another via a thermoplastic intermediate layer. The intermediate layer has, at least in some sections, a cutback relative to a pane edge, and at least one light-diffusing optical fiber. The optical fiber is at least partially arranged in the region of the cutback, between the outer pane and the inner pane.

23 Claims, 3 Drawing Sheets

Figure 1A:
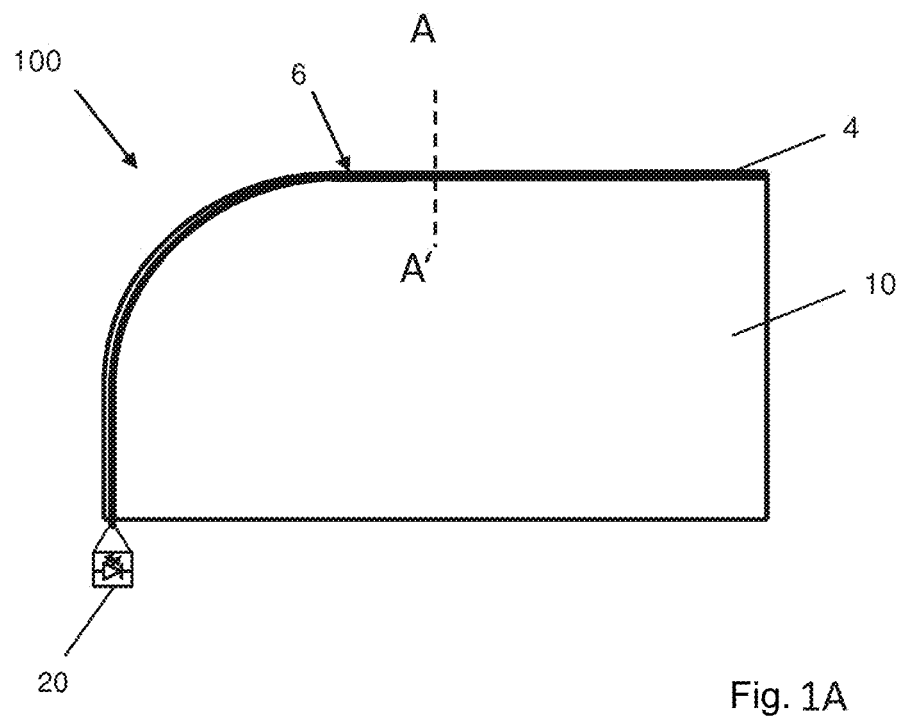

(51) Int. Cl.

| | | |
|---|---|---|
| *G02B 6/00* | (2006.01) | |
| *B60Q 1/00* | (2006.01) | |
| *B32B 3/02* | (2006.01) | |
| *B32B 5/02* | (2006.01) | |
| *B32B 7/12* | (2006.01) | |
| *B60Q 1/26* | (2006.01) | |
| *F21V 8/00* | (2006.01) | |
| *H05B 3/86* | (2006.01) | |
| *B60Q 1/50* | (2006.01) | |
| *B60Q 9/00* | (2006.01) | |
| *B60Q 3/64* | (2017.01) | |
| *B60Q 3/208* | (2017.01) | |
| *B60Q 3/43* | (2017.01) | |
| *F21S 43/239* | (2018.01) | |
| *F21S 43/245* | (2018.01) | |
| *F21S 43/251* | (2018.01) | |

(52) U.S. Cl.
CPC .......... *B32B 7/12* (2013.01); *B32B 17/10541* (2013.01); *B32B 17/10761* (2013.01); *B60Q 1/00* (2013.01); *B60Q 1/268* (2013.01); *B60Q 1/2696* (2013.01); *B60Q 1/50* (2013.01); *B60Q 3/208* (2017.02); *B60Q 3/43* (2017.02); *B60Q 3/64* (2017.02); *B60Q 9/00* (2013.01); *F21S 43/239* (2018.01); *F21S 43/245* (2018.01); *F21S 43/251* (2018.01); *G02B 6/00* (2013.01); *G02B 6/001* (2013.01); *G02B 6/0006* (2013.01); *H05B 3/86* (2013.01); *B32B 2250/03* (2013.01); *B32B 2260/021* (2013.01); *B32B 2262/101* (2013.01); *B32B 2307/42* (2013.01); *B32B 2605/006* (2013.01)

(56) References Cited

U.S. PATENT DOCUMENTS

| | | |
|---|---|---|
| 2007/0154705 A1 | 7/2007 | Doeppner et al. |
| 2007/0227096 A1 | 10/2007 | Schaumberger et al. |
| 2008/0061789 A1 | 3/2008 | Coates et al. |
| 2011/0122646 A1 | 5/2011 | Bickham et al. |
| 2013/0141907 A1 | 6/2013 | Doi et al. |
| 2013/0299856 A1* | 11/2013 | Verger .................. B32B 17/067 257/88 |
| 2014/0240997 A1 | 8/2014 | Massault et al. |
| 2015/0131955 A1 | 5/2015 | Bennett et al. |
| 2015/0253486 A1 | 9/2015 | Verger et al. |
| 2015/0349296 A1 | 12/2015 | Mashima et al. |
| 2016/0054484 A1 | 2/2016 | Kikuchi et al. |
| 2017/0135155 A1 | 5/2017 | Klein et al. |
| 2018/0345631 A1 | 12/2018 | Klein et al. |
| 2018/0370196 A1 | 12/2018 | Klein et al. |

FOREIGN PATENT DOCUMENTS

| | | |
|---|---|---|
| DE | 102008004049 A1 | 7/2009 |
| EP | 2025510 A1 | 2/2009 |
| JP | H0513865 B2 | 2/1993 |
| JP | H0687328 A | 3/1994 |
| JP | H11321304 A | 11/1999 |
| JP | 2014504786 A | 2/2014 |
| JP | 2015529935 A | 10/2015 |
| KR | 20060123233 A | 12/2006 |
| KR | 20140037913 A | 3/2014 |
| WO | 2004/082934 A1 | 9/2004 |
| WO | 2005/054915 A1 | 6/2005 |
| WO | 2007/077099 A1 | 7/2007 |
| WO | WO 2007077099 * | 7/2007 .............. B60Q 3/02 |
| WO | 2008/061789 A1 | 5/2008 |
| WO | 2016/000927 A1 | 1/2016 |
| WO | 2017/029254 A1 | 2/2017 |
| WO | 2017/153330 A1 | 9/2017 |
| WO | 2017/153331 A1 | 9/2017 |

OTHER PUBLICATIONS

International Search Report for PCT/EP2017/055180 filed on Mar. 6, 2017 on behalf of Saint-Gobain Glass France, dated May 29, 2017. 7 pages. (German original + English translation).
International Search Report for PCT/EP2017/055181 filed on Mar. 6, 2017 on behalf of Saint-Gobain Glass France, dated May 24, 2017. 7 pages. (German original + English translation).
Written Opinion for PCT/EP2016/069323 filed on Aug. 15, 2016 on behalf of Saint-Gobain Glass France, dated Nov. 15, 2016. 10 pages. (German original + English translation).
Canadian Examination Report for EP2016/069323 on behalf of Saint-Gobain Glass France, dated Dec. 20, 2018. 3 pages.
International Preliminary Report on Patentability for Application No. PCT/EP2016/069323 Filed Aug. 15, 2016 on behalf of Saint-Gobain Glass France, dated Feb. 20, 2018. 6 pages.
International Preliminary Report on Patentability for International Application No. PCT/EP2017/055180 filed Mar. 6, 2017 on behalf of Saint-Gobain Glass France, dated Sep. 11, 2018. 15 pages.
International Preliminary Report on Patentability for International Application No. PCT/EP2017/055181 filed Mar. 6, 2017 on behalf of Saint-Gobain Glass France, dated Sep. 11, 2018. 16 pages.
KIPOs Notice of Preliminary Rejection, dated Mar. 2, 2018. 8 pages.
Non-Final Office Action for U.S. Appl. No. 15/780,615, filed May 31, 2018, on behalf of Saint-Gobain Glass France, dated Jan. 22, 2019. 21 pages.
Russian Official Action for EP2016/069323, dated Mar. 22, 2019. 4 pages.
Russian Search Report for EP2016/069323, dated Aug. 30, 2018. 2 pages.
Notice of Allowance for U.S. Appl. No. 15/741,244 filed Dec. 30, 2017 on behalf of Saint-Gobain Glass France, dated Feb. 13, 2019. 7 pages.
Written Opinion for International Application No. PCT/EP2017/055180 filed Mar. 6, 2017 on behalf of Saint-Gobain Glass France, dated May 29, 2017. 13 pages.
Written Opinion for International Application No. PCT/EP2017/055181 filed Mar. 6, 2017 on behalf of Saint-Gobain Glass France, dated May 24,2017. 14 pages.
Japanese Office Action for Japanese Application No. 2018533619 filed Jun. 25, 2018 on behalf of Saint-Gobain Glass France, dated Jun. 4, 2019, 5 pages.
Russian Official Action for 2018123320 filed Mar. 6, 2017 on behalf of Saint-Gobain Glass France, dated May 29, 2019. 3 pages. (Translation Only).
Notice of Allowance for U.S. Appl. No. 15/780,615, filed May 31, 2018, on behalf of Saint-Gobain Glass France, dated May 7, 2019. 10 pages.
Japanese Office Action for Japanese Application No. 2018507564 filed Feb. 13, 2018 on behalf of Saint-Gobain Glass France, dated Feb. 25, 2019, 7 pages.
Russian Search Report for 2018123320 filed on Mar. 6, 2017 on behalf of Saint-Gobain Glass France, dated May 29, 2019. 2 pages. (Translation Only).

* cited by examiner

I. Arranging a thermoplastic intermediate layer (3) between an outer pane (1) and an inner pane (2)

II. Bonding the outer pane (1) to the inner pane (2) via the intermediate layer (3) by lamination III. Cutting back the thermoplastic intermediate layer (3), at least in sections, between the outer pane (1) and the inner pane (2) with a cutting tool IV. Gluing a light-diffusing glass fiber (4) into a region of the cutback (7) with an adhesive means (5)

Fig. 3

COMPOSITE PANE WITH ILLUMINATION

CROSS REFERENCE TO RELATED APPLICATIONS

The present application is the U.S. national stage of International Patent Application PCT/EP2016/069323 filed internationally on Aug. 15, 2016, which, in turn, claims priority to European Patent Application No. EP 15181016.5 filed on Aug. 14, 2015.

The invention relates to a composite pane, in particular a side window pane of a vehicle, with an illuminated border as well as a method for production thereof and use thereof.

Composite panes comprise at least one outer pane, one inner pane, and one adherable intermediate layer that areally bonds the outer pane to the the inner pane. Typical intermediate layers are polyvinyl butyral films, which have, in addition to their adhesive properties, high toughness and high acoustic damping. The intermediate layer prevents the disintegration of the composite glass pane in the event of damage. The composite pane merely cracks but remains dimensionally stable.

Composite panes have clear advantages compared to single-pane safety glass: High acoustic insulation can be obtained by means of a composite pane, which is, for example, particularly advantageous for the separation of motor vehicle interiors from their external environment. Consequently, in addition to windshields, side windows of motor vehicles are also increasingly made of composite glass. At the same time, a composite pane has greater penetration inhibition than a single-pane safety glass and is thus more stable against penetration of foreign bodies or break-in attempts.

The object of the present invention is to provide an improved composite pane with a border illuminable at least in sections. Integration of the illumination into the composite pane should be simple and cost-effective.

The object of the present invention is accomplished according to the invention by a composite pane according to this disclosure. Preferred embodiments are apparent from this disclosure.

The composite pane according to the invention comprises at least:
- an outer pane and an inner pane that are bonded to one another via an intermediate layer, wherein the intermediate layer has, at least in sections, a cutback relative to a side edge of the outer pane and/or the inner pane and
- at least one light-diffusing glass fiber, wherein the light-diffusing glass fiber is arranged at least partially in the region of the cutback between the outer pane and the inner pane.

In an advantageous embodiment, the composite pane according to the invention is a laminated side pane that is intended for a, preferably openable, side window of a vehicle. The term "an openable side window" means a side window that can be opened and closed again by substantially vertical displacement of the side window into the vehicle door.

The terms "outer pane" and "inner pane" serve merely to distinguish a first pane and a second pane. In the case of use of the composite pane as a vehicle pane or as a building pane, the outer pane is preferably but not necessarily turned toward the exterior of the composite pane; and the inner pane, toward the interior.

The glass fiber according to the invention is a light-diffusing glass fiber that emits light by diffusion via its side wall over its extension length. Such glass fibers are usually made of at least a glass fiber core that is surrounded by one or a plurality of sheath-shaped layers arranged around the glass fiber core. The sheath layers usually have a large number of diffusion centers, for example, nanopores or nanoparticles. Suitable light-diffusing glass fibers are well known to the person skilled in the art. Merely by way of example, reference is made here to the glass fibers mentioned in US 2011/0122646 A1 or US 2015/0131955 A1. The thickness of the glass fiber is typically from 5 µm to 300 µm, preferably from 100 µm to 250 µm. Of course, as a result of suitable production or processing, the glass fiber can also have light-diffusing regions only in sections. The glass fiber has at least one glass fiber section or glass fiber region that is implemented such that, by diffusion, light can be emitted or is emitted over an extension length of the glass fiber section or glass fiber region. The glass fiber can, in particular, be implemented such that, over its entire extension length, light can be or is emitted via the sidewall. In the context of the present invention, the term "light-diffusing glass fiber" also means a bundle or braid of a plurality of individual glass fibers that are arranged as a unit in the region of the cutback.

The intermediate layer according to the invention has, at least in sections, a cutback relative to a side edge. Here, the term "cutback" means any offset or any shortening of the intermediate layer relative to the pane edge. This also means, in particular, an intermediate layer, produced by production technology such that it has an offset relative to the pane edge (without necessarily having to be cut). In an advantageous embodiment of the composite pane according to the invention, the width r of the cutback is from 0.1 µm to 2 mm and preferably from 0.1 mm to 1 mm. This is particularly advantageous, since in this manner good fixing of the glass fiber on the the composite pane is effected. If the side edge of the outer pane is not arranged flush with the side edge of the inner pane, the width r of the cutback is based on the side edge of the pane that is set back relative to the other pane.

In another advantageous embodiment of the composite pane according to the invention, the width r of the cutback is from 10% of the diameter d of the glass fiber to 400% of the diameter d and preferably from 50% of the diameter d to 200% of the diameter d, particularly preferably from 70% of the diameter d to 150% of the diameter d. This is particularly advantageous, since in this manner good fixing of the glass fiber on the composite pane is enabled. In particular, in the preferred range from r=70% d to 150% d, the glass fiber is almost completely protected by the outer pane and the inner pane. In particular, the width r of the cutback is from 100% d to 150% d such that the glass fiber is arranged completely in the region of the cutback.

In another advantageous embodiment of the composite pane according to the invention, the glass fiber is glued by an adhesive means into the region of the cutback and, in this manner, fixedly bonded to the interior-side surface II of the outer pane, the exterior-side surface III of the inner pane, and/or the side edge of the intermediate layer. This has the particular advantage that the glass fiber is fixedly bonded to the composite pane.

Particularly advantageous adhesive means are adhesives, particularly preferably acrylate adhesives, methyl methacrylate adhesives, cyanoacrylate adhesives, polyepoxides, silicone adhesives, and/or silane cross-linking polymeric adhesives, mixtures, and/or copolymers thereof.

In an alternative embodiment of the composite pane according to the invention, the glass fiber is fastened in the region of the cutback by clamping between the outer pane and the inner pane. This has the particular advantage that no adhesive means and no special process step is necessary for fixing the glass fiber in the composite pane.

The outer pane and/or the inner pane preferably contain glass, in particular soda lime glass, or plastics, preferably rigid plastics, in particular polycarbonate or polymethylmethacrylate. The thickness of the panes can vary greatly and thus be ideally adapted to the requirements in the individual case. Preferably, the thicknesses of the outer pane and of the inner pane are from 0.5 mm to 10 mm and preferably from 1 mm to 5 mm, most particularly preferably from 1.4 mm to 3 mm.

The outer pane, the inner pane, or the intermediate layer can be clear and colorless, but also tinted, frosted, or colored. The outer pane and the inner pane can be made of non-prestressed, partially prestressed, or prestressed glass.

The intermediate layer is formed by at least one thermoplastic bonding film. The thermoplastic bonding film contains at least one thermoplastic polymer, preferably ethylene vinyl acetate (EVA), polyvinyl butyral (PVB), or polyurethane (PU) or mixtures or copolymers or derivatives thereof. The thickness of the intermediate layer and, in particular, of the thermoplastic bonding film is preferably from 0.2 mm to 2 mm, particularly preferably from 0.3 mm to 1 mm, for example, 0.38 mm or 0.76 mm.

In another advantageous embodiment, the composite pane according to the invention has heating means for electrical heating of the composite pane. Preferred heating means are electrically conductive wires and/or one or a plurality of electrically heatable, transparent, electrically conductive layers.

The side pane according to the invention can have other functionalities besides the heating function effected by the heating means. In an advantageous embodiment, the composite pane has a reflecting coating for the infrared range. Such a coating can be applied on a surface of the outer pane or on a surface of the inner pane, preferably on a surface facing the intermediate layer, in order to protect the coating against corrosion and mechanical action. Alternatively, the coating can be introduced into the composite, in the form of a coated thermoplastic film, for example, made of polyethylene terephthalate (PET). In this case, the coated film is preferably arranged between a first and a second thermoplastic bonding film. IR-reflecting coatings typically have at least one electrically conductive layer. Additionally, the coating can have dielectric layers that serve, for example, to regulate the sheet resistance, to protect against corrosion, or to reduce reflection. The conductive layer preferably contains silver or an electrically conductive oxide (transparent conductive oxide, TCO) such as indium tin oxide (ITO). The conductive layer preferably has a thickness of 10 nm to 200 nm. To improve conductivity with simultaneously high transparency, the coating can have a plurality of electrically conductive layers that are separated from one another by at least one dielectric layer. The conductive coating can include, for example, two, three, or four electrically conductive layers. Typical dielectric layers contain oxides or nitrides, for example, silicon nitride, silicon oxide, aluminum nitride, aluminum oxide, zinc oxide, or titanium oxide. Of course, these electrically conductive, transparent coatings can also serve for the electrical heating of the pane. The coating preferably has a smaller surface area than the side pane such that a peripheral edge region with a width of preferably 0.5 mm to 10 mm is not provided with the coating. The conductive coating is thus protected inside the intermediate layer against contact with the surrounding atmosphere, which is advantageous in terms of the prevention of corrosion. The composite pane can also have other uncoated regions, for example, data transmission windows or communication windows.

Another aspect of the invention is a composite pane arrangement, at least comprising:
 a composite pane according to the invention, and
 a lighting means for coupling light into the glass fiber.

The lighting means is preferably arranged on one side edge of the composite pane. In the case of a movable composite pane, such as an openable side window pane, the lighting means is preferably connected to the composite pane and likewise arranged movably. Of course, the lighting means can also be installed independent of the composite pane and can be connected to the light-diffusing glass fiber according to the invention via a preferably non-light-diffusing glass fiber.

Advantageous lighting means are, for example, laser diodes, light-emitting diodes (LEDs), or incandescent bulbs, with the invention including any type of light source that is suitable for a respective use. The lighting means according to the invention also include lens systems, mirror systems, reflector systems, or other light guides that can serve for the coupling of the light into the glass fiber according to the invention.

The lighting means can be colored or white. The lighting means can also give off light in the ultraviolet range, so long as the glass fiber or its surroundings can convert the ultraviolet light into visible light. Preferred light colors are red (due to the pronounced signaling effect), green (due to the high sensitivity of the human eye for the green color spectrum), and blue (due to its particularly aesthetic and less dazzling effect).

Another aspect of the invention is a method for producing a composite pane according to the invention, at least comprising:
 (a) Arranging a thermoplastic intermediate layer between an outer pane and an inner pane, wherein the intermediate layer has at least one cutback relative to the side edges of the pane,
 (b) Bonding the outer pane to the inner pane via the intermediate layer by lamination,
 (c) Gluing a light-diffusing glass fiber into a region of the cutback with an adhesive means.

Of course, the process steps b) and c) can also be reversed.

This method can be improved by the following alternative method for producing a composite pane according to the invention, which at least comprises:
 (a) Arranging a thermoplastic intermediate layer between an outer pane and an inner pane,
 (b) Bonding the outer pane to the inner pane via the intermediate layer by lamination,
 (c) Cutting back, at least in sections, the thermoplastic intermediate layer between the outer pane and the inner pane with a cutting tool,
 (d) Gluing a light-diffusing glass fiber into a region of the cutback with an adhesive means.

The production of the composite glass by lamination is done with customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

A cutting tool according to the invention is, for example, a blade of a knife, in particular, a V-shaped blade that is guided along the side edge between the outer pane and the inner pane and removes the intermediate layer in a narrow region in the form of a cutback.

A further aspect of the invention includes the use of the composite pane according to the invention in means of transportation for travel on land, in the air, or on water, in particular in trains, watercraft, and motor vehicles, for example, as a windshield, rear window, side window, and/or roof panel, in buildings, in particular in the access area, window area, roof area, or façade area, as a built-in component in furniture and appliances.

The composite pane according to the invention is particularly preferably a glazing that is frameless in sections, wherein the light-diffusing glass fiber according to the invention is arranged on the frameless side edges. The light-diffusing glass fiber can also be arranged on an inner side edge, for example, in the region of a cutout made in the glazing such as a skylight in a roof panel.

The composite pane according to the invention is preferably implemented as a stationary glazing, in other words, the glazing is arranged stationary relative to its surroundings and fixed, for example, by section-wise fastening, for example, as a windshield in a vehicle or as a glass partition in a building or in a piece of furniture.

The composite pane according to the invention is alternatively implemented as a movable glazing, in other words, the glazing is arranged movable relative to its surroundings, for example, as glazing arranged movably in a door, such as a side window pane in a vehicle door.

Another aspect of the invention includes the use of a lighting means according to the invention in a composite pane arrangement for the identification of an electrical function, preferably a heating function, a movement of the composite pane according to the invention, preferably of an opening or closing side window and/or as a warning function, preferably in the case of a frameless side window in an opened vehicle door.

In the following, the invention is explained in detail with reference to drawings and exemplary embodiments. The drawings are schematic depictions and not true to scale. The drawings in no way restrict the invention.

Figure 1B:
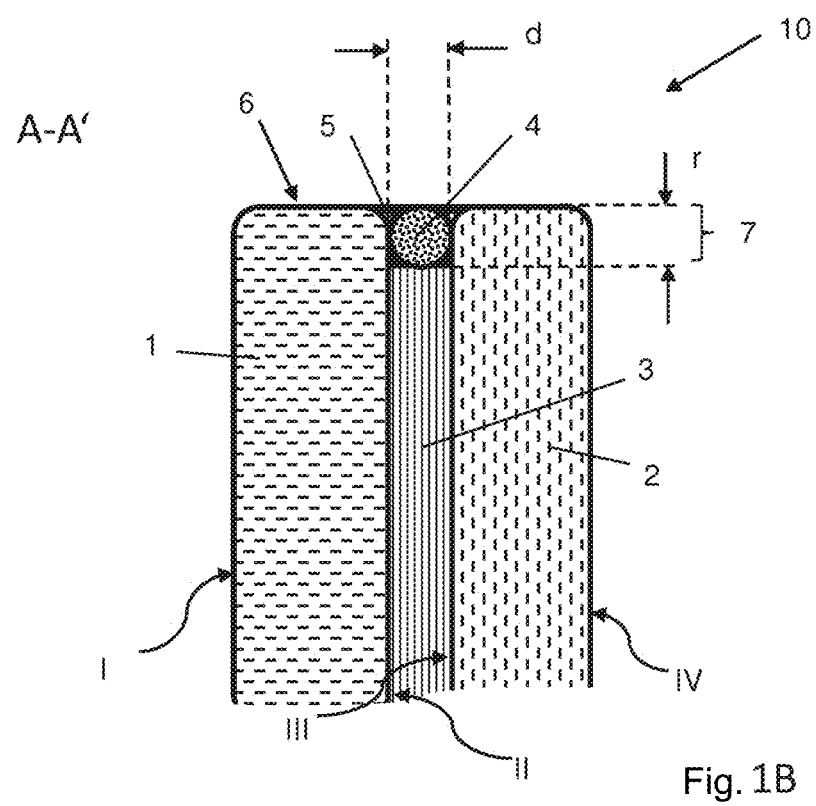
Figure 2:
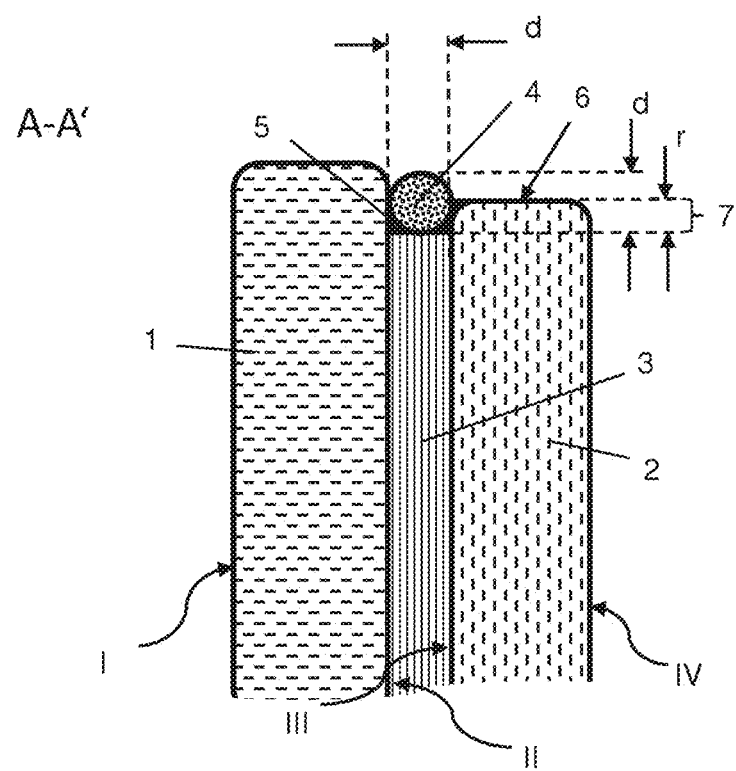

They depict:

FIG. 1A a plan view of an embodiment of the composite pane arrangement according to the invention, FIG. 1B a cross-sectional view along the section line A-A' through the composite pane of FIG. 1A, FIG. 2 a cross-sectional view along the section line A-A' through an alternative embodiment of a composite pane according to the invention of FIG. 1A, FIG. 3 a flowchart of an embodiment of the method according to the invention.

FIG. 1A depicts a plan view of a composite pane arrangement 100 according to the invention, which includes a composite pane 10 according to the invention and a lighting means 20. FIG. 1B depicts a cross-sectional view along the section line A-A' through the composite pane 10 of FIG. 1A. The composite pane 10 is configured as a side pane for a side window of a passenger car in this example.

The composite pane 10 according to the invention includes an outer pane 1 with an interior-side surface II, an inner pane 2 with an exterior-side surface III, and a thermoplastic intermediate layer 3 that bonds the interior-side surface 11 of the outer pane 1 to the exterior-side surface III of the inner pane 2 via the pane surface. The outer pane 1 and the inner pane 2 are made, for example, of soda lime glass and have, for example, a thickness of 2.1 mm in each case. The thermoplastic intermediate layer 3 is, for example, a film made of polyvinyl butyral (PVB) with a thickness of 0.76 mm. Of course, other glass panes or polymeric panes can also be used as the outer pane and inner pane. Furthermore, the thickness of the outer pane 1 and inner pane 2 can be adapted to the respective use.

The thermoplastic intermediate layer 3 is cut back in the region of the side edge 6 compared to the outer pane 1 or the inner pane 2. A light-diffusing glass fiber 4 is glued into the cut-back region 7, for example, with an adhesive means 5 made of cyanoacrylate adhesive. The light-diffusing glass fiber 4 has a diameter d of 200 μm. The width r of the cutback is, for example, 250 μm. The width r of the cutback corresponds here roughly to the diameter d of the light-diffusing glass fiber 4. A lighting means 20 is arranged on one end of the glass fiber 4. The lighting means 20 consists, for example, of a laser diode, which can, for example, couple light into the glass fiber 4 via a reflector. Upon application of a voltage to the laser diode, light is coupled into the glass fiber 4. The glass fiber 4 diffuses the light on its surface along its entire extension length such that the glass fiber 4 lights up over its entire extension length.

By means of the arrangement of the light-diffusing glass fiber 4 in the cutback 7, the glass fiber 4 is particularly well protected against mechanical stresses. In addition, the glass fiber 4 is hardly visible in the non-illuminated state, which is particularly advantageous from an aesthetic standpoint.

FIG. 2 depicts a cross-sectional view along the section line A-A' through an alternative embodiment of a composite pane 10 according to the invention of FIG. 1A. The composite pane 10 of FIG. 2 corresponds substantially in the materials and in the structure to the composite pane 10 of FIG. 1B, such that, in the following, only the differences between the two composite panes 10 are dealt with.

The composite pane 10 is, for example, a side pane of a vehicle door of a passenger car. The border of the side pane in the vehicle door is, for example, frameless, such that the side pane is guided and inserted into the vehicle door only at its lower side. Here, the lighting means 20 is, for example, a high-performance light-emitting diode.

In FIG. 2, the outer pane 1 protrudes 1 mm beyond the inner pane 2 on the side edge 6. The width r of the cutback 7 is approx. 100 μm based on the set-back pane (here, the inner pane 2). The width r of the cutback 7 is thus approx. 50% of the diameter d of the glass fiber 4.

The composite pane arrangement 100 produced with this composite pane 10 is, for example, configured such that, upon opening of the vehicle door, the lighting means 20 is activated and the glass fiber 4 is illuminated. This has the particular advantage that the vehicle door is illuminated in the opened state and is particularly well discernible by other road users. The visibility of the composite pane 10 thus illuminated is particularly increased in the darkness—in particular since the composite pane 10 in this example is frameless and is fastened in the vehicle door only at its lower side edge. The side edge of the composite pane 10 illuminated by the glass fiber 4 is thus freely visible without obstruction.

The lighting means 20 can be monochromatic or can identify different states by different colors. Thus, the warning function is particularly high for a red lighting means, since a red color is commonly associated with danger. Green lighting means are readily discerned in the dark since the human eye has particularly high sensitivity for the green color spectrum.

In another exemplary embodiment, the lighting means 20 has, for example, a red light-emitting diode and a blue light-emitting diode. In that case, the composite pane arrangement 100 is connected, for example, to the vehicle's electronic system such that when the composite pane 10 is opened by an electrical window lifter, the glass fiber 4 is illuminated with blue light; and when the composite pane 10 is closed, the glass fiber 4 is illuminated with red light. This has the particular advantage that the direction of movement of the composite pane 10 relative to the doorframe thus becomes visible and individuals can quickly recognize the danger of entrapment of body parts or objects in the closing window. Of course, other colors or white light can also be used for the illumination of the glass fiber 4. Furthermore, other functions can also be indicated by the illumination of the composite pane 10 or particularly aesthetic lighting can be realized.

Composite panes 10 according to the invention can optionally have an additional electrical function and, for example, an electrical heating function. For example, heating means (not shown here), such as heating wires or heating layers can be arranged in the region between the outer pane 1 and the inner pane 2. Such heating wires are made, for example, of copper or tungsten and have a thickness of, for example, 30 µm. Transparent, electrically conductive coatings, as described above, are, for example, known as heating layers. Heating wires and heating layers can be formed, for example, by busbars, for example, strips of a copper foil with a thickness of, for example, 100 µm and a width of, for example, 7 mm. When a voltage is applied to the busbars, a current flows through the heating wires or heating layer, by which means the heating effect is produced. The voltage can be the usual automobile on-board voltage of 14 V, or even a voltage of, for example, 42 V or 48 V. Of course, the voltage can also be a customary supply voltage of, for example, 110 V or 220 V, in particular with the use of a composite pane 10 according to the invention in building technology, such as a transparent heater. The corresponding level of heating of the composite pane 10 can, again, be indicated by the illumination of the glass fiber 4 by the lighting means 20.

FIG. 3 depicts a flowchart of an exemplary embodiment of the method according to the invention for producing a composite pane 10 according to the invention. The method according to the invention comprises, for example, the following steps:
I. Arranging a thermoplastic intermediate layer (3) between an outer pane (1) and an inner pane (2);
II. Bonding the outer pane (1) to the inner pane (2) via the intermediate layer (3) by lamination;
III. Cutting back, at least in sections, the thermoplastic intermediate layer (3) between the outer pane (1) and the inner pane (2) with a cutting tool;
IV. Gluing a light-diffusing glass fiber (4) into a region of the cutback (7) with an adhesive means (5).

LIST OF REFERENCE CHARACTERS 1 outer pane
2 inner pane
3 intermediate layer, thermoplastic intermediate layer
4 light-diffusing glass fiber
5 adhesive means
6 side edge
7 cutback
10 composite pane
20 lighting means
100 composite pane arrangement
d diameter of the light-diffusing glass fiber 4
r width of the cutback 7
A-A' section line

The invention claimed is:

1. A composite pane, being a laminated side pane for a side window of a vehicle, comprising:
    an outer pane and an inner pane that are bonded to one another via an intermediate layer, wherein the intermediate layer has, at least in sections, a cutback relative to a side edge; and
    at least one light-diffusing glass fiber, wherein the light-diffusing glass fiber is arranged at least partially in a region of the cutback, between the outer pane and the inner pane.

2. The composite pane according to claim 1, wherein a width of the cutback is from 0.1 µm to 2 mm.

3. The composite pane according to claim 1, wherein a width of the cutback is from 10% to 400% of a diameter of the glass fiber.

4. The composite pane according to claim 1, wherein the glass fiber is glued into a region of the cutback by an adhesive means.

5. The composite pane according to claim 4, wherein the adhesive means contains an adhesive.

6. The composite pane according to claim 1, wherein the glass fiber is fastened in the region of the cutback by clamping.

7. The composite pane according to claim 1, wherein the composite pane has at least one heating means for the electrical heating of the composite pane.

8. The composite pane according to claim 7, wherein the heating means comprises at least one electrically conductive wire and/or at least one electrically heatable, transparent, electrically conductive layer.

9. A composite pane arrangement, comprising:
    a composite pane according to claim 1; and
    a lighting means for coupling light into the glass fiber.

10. The composite pane arrangement according to claim 9, wherein the lighting means contains at least one laser diode or at least one light-emitting diode.

11. A method for producing a composite pane, comprising:
    (a) arranging a thermoplastic intermediate layer between an outer pane and an inner pane;
    (b) bonding the outer pane to the inner pane via the intermediate layer by lamination;
    (c) cutting back the thermoplastic intermediate layer at least in sections between the outer pane and the inner pane with a cutting tool; and
    (d) gluing at least one light-diffusing glass fiber into a region of the cutback with an adhesive means.

12. The method according to claim 11, wherein the cutting tool is a blade of a knife or a V-shaped blade.

13. A method, comprising:
    providing the composite pane according to claim 1; and
    using the the composite pane in means of transportation for travel on land, in the air, or on water, in trains, watercraft, and motor vehicles, as a windshield, rear window, side window, and/or roof panel.

14. A method for using a lighting means in a composite pane arrangement, comprising:
    providing a lighting means; and
    using the lighting means in a composite pane arrangement according to claim 9 for the identification of an electrical function.

15. A method for using a lighting means in a composite pane arrangement, comprising:
    providing a lighting means; and
    using the lighting means in a composite pane arrangement according to claim 9 as a warning function.

16. The composite pane according to claim 1, wherein a width of the cutback is from 0.1 mm to 1 mm.

17. The composite pane according to claim 1, wherein a width of the cutback is from 50% to 200% of a diameter of the glass fiber.

18. The composite pane according to claim 1, wherein a width of the cutback is from 70% to 150% of a diameter of the glass fiber.

19. The composite according to claim 4, wherein the adhesive means contains an acrylate adhesive, a methyl methylacrylate adhesive, a cyanoacrylate adhesive, a polyepoxide, a silicone adhesive, and/or a silane cross-linking polymeric adhesive, mixtures, and/or copolymers thereof.

20. A method comprising using a lighting means in a composite pane arrangement according to claim 9 for the identification of a heating function and/or a movement of the composite pane.

21. The method according to claim 20, wherein the composite pane is an opening or closing side window.

22. A method, comprising using the lighting means in the composite pane arrangement according to claim 9, as a warning function, in an at least partially frameless side pane, in an opened vehicle door.

23. A method, comprising using the composite pane according to claim 1 in buildings, including in the access area, window area, roof area, façade area, or as a built-in component in furniture and appliances.

* * * * *